(No Model.)
R. A. HOLT.
ATTACHMENT FOR COFFEE POTS.
No. 298,973. Patented May 20, 1884.
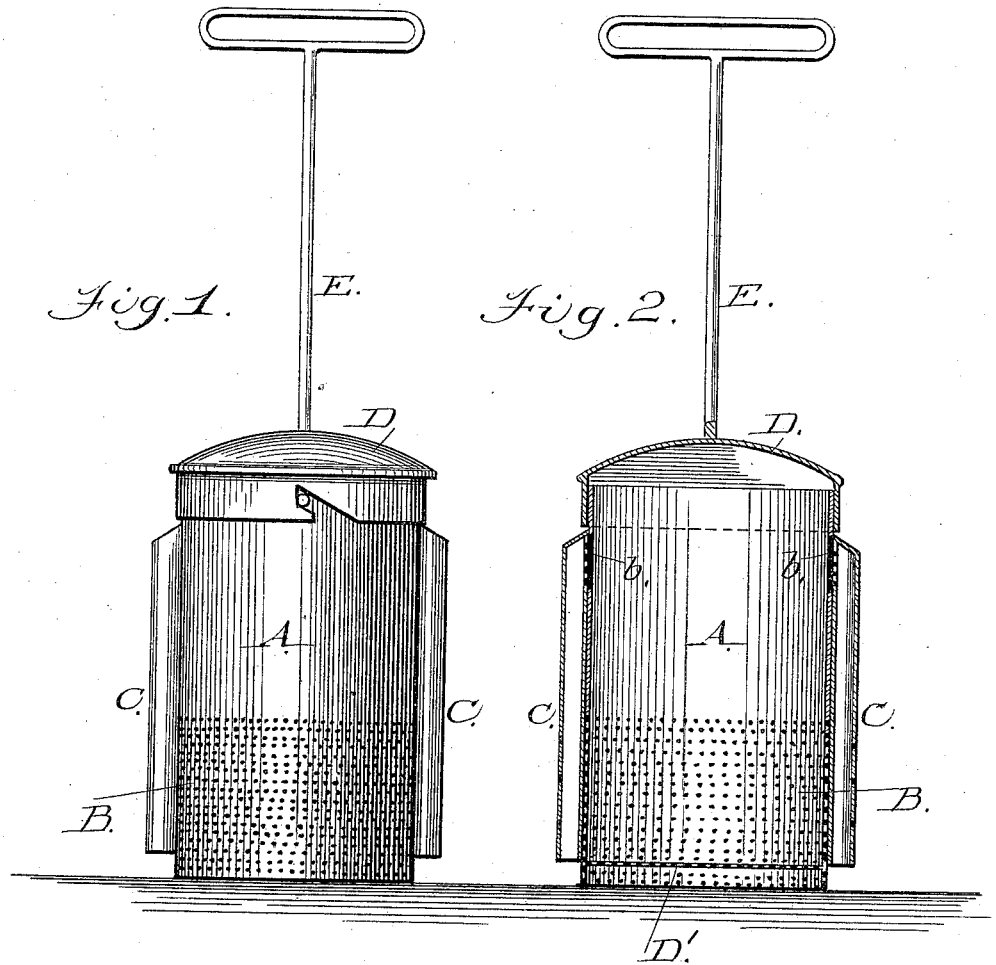

UNITED STATES PATENT OFFICE.

ROBERT A. HOLT, OF LEBANON, MISSOURI.

ATTACHMENT FOR COFFEE-POTS.

SPECIFICATION forming part of Letters Patent No. 298,973, dated May 20, 1884.

Application filed December 4, 1883. (No model.)

*To all whom it may concern:*

Be it known that I, ROBERT A. HOLT, a citizen of the United States, residing at Lebanon, in the county of Laclede and State of Missouri, have invented a new and useful Improvement in Attachments for Coffee-Boilers or Tea-Pots, of which the following is a specification.

My invention consists in and relates to a novel and effectual arrangement of the condensing apparatus for coffee-boilers or tea-pots, and for preserving the fine aroma of the coffee or tea, which escapes with the steam when made in an open vessel; and it also consists in the novel arrangement and combination of parts, as will be hereinafter more fully set forth, and pointed out in the claim. I attain these objects by the mechanism illustrated in the accompanying drawings, in which—

Figure 1 is a vertical view of my improvement, and Fig. 2 a section of the same.

Similar letters refer to similar parts throughout the several views.

In the drawings, A represents a cylindrical chamber, having its lower portion, B, perforated, as shown. Conveniently secured to the sides of the chamber are the tubes C C, having connections with the interior of the chamber by means of the openings $b$, the said tubes reaching down to very nearly the bottom of the chamber. To the chamber A, I attach, by means of a bayonet-joint or otherwise, a cover, D, having secured to its upper surface a projecting rod or stem, E, made preferably in the manner here shown, and for the purpose of placing in boilers or tea-pots or taking it out. In the interior of the chamber, and secured near its bottom, is a perforated floor, D'.

The operation will be readily understood. The coffee or tea being placed in the chamber, and the whole being put into a suitable receptacle, the aroma, as it rises to the top, will pass through the tubes to the bottom of the receptacle, when it will again mingle with the coffee or tea grounds, and thereby prevent the aroma from being lost.

Having thus fully described my invention, what I claim, and desire to secure by Letters Patent, is—

The combination, with a coffee or tea pot, of the chamber A, perforated at $b$ and at the lower end around its periphery, and side pipes, C, having open lower ends and closed upper ends, and a cover, D, having handle E, and locked to the chamber A, all constructed to operate substantially as and for the purpose herein set forth.

ROBERT A. HOLT.

Witnesses:
JOHN W. FARRIS,
T. B. BURLEY.